(12) United States Patent  (10) Patent No.: US 8,380,561 B1
Viegas et al.  (45) Date of Patent: Feb. 19, 2013

(54) METHOD AND APPARATUS FOR SCORING HAPTIC DEVICES

(75) Inventors: Victor Viegas, Atherton, CA (US); Danny A. Grant, Laval (CA); Chris Ullrich, Santa Cruz, CA (US); Erin Ramasy, Montreal (CA)

(73) Assignee: Immersion Corporation, San Jose, CA (US)

( * ) Notice: Subject to any disclaimer, the term of this patent is extended or adjusted under 35 U.S.C. 154(b) by 872 days.

(21) Appl. No.: 12/182,507

(22) Filed: Jul. 30, 2008

(51) Int. Cl.
  *G06Q 30/00* (2012.01)
(52) U.S. Cl. .......... 705/7.38; 705/10; 345/156; 463/30; 119/174
(58) Field of Classification Search .......... 705/10, 705/7.38; 463/30; 119/174; 345/156
  See application file for complete search history.

(56) References Cited

U.S. PATENT DOCUMENTS

| | | | | |
|---|---|---|---|---|
| 4,860,215 A | * | 8/1989 | Seraji | 700/260 |
| 6,262,738 B1 | * | 7/2001 | Gibson et al. | 345/419 |
| 6,275,213 B1 | * | 8/2001 | Tremblay et al. | 345/156 |
| 6,604,064 B1 | * | 8/2003 | Wolff et al. | 703/7 |
| 6,621,448 B1 | * | 9/2003 | Lasky et al. | 342/22 |
| 7,952,483 B2 | * | 5/2011 | Ferguson et al. | 340/573.1 |
| 2002/0133093 A1 | * | 9/2002 | Mayrose et al. | 600/587 |
| 2003/0149803 A1 | * | 8/2003 | Wilson | 710/1 |
| 2005/0113167 A1 | * | 5/2005 | Buchner et al. | 463/30 |
| 2008/0221925 A1 | * | 9/2008 | Jones | 705/2 |
| 2008/0243581 A1 | * | 10/2008 | Jennings | 705/9 |
| 2009/0125380 A1 | * | 5/2009 | Otto et al. | 705/10 |
| 2009/0182620 A1 | * | 7/2009 | Sunvold | 705/10 |

* cited by examiner

*Primary Examiner* — Vanel Frenel
(74) *Attorney, Agent, or Firm* — Pillsbury Winthrop Shaw Pittman LLP

(57) ABSTRACT

A method for scoring a haptic device using subjective and objective measurements is disclosed. A method of process, in one embodiment, is configured to obtain multiple objective measurements and the subjective measurements, wherein the objective measurements describe the performance of the haptic device. The subjective measurements indicate users' feedback and/or experience in connection with the haptic device. The process is capable of generating a score in response to the objective measurements and the subjective measurements. The score, for example, can be used to rate and/or evaluate the performance of the haptic device.

22 Claims, 5 Drawing Sheets

METHOD AND APPARATUS FOR SCORING HAPTIC DEVICES

FIELD

The exemplary embodiment(s) of the present invention relates to a field of performance evaluation. More specifically, the exemplary embodiment(s) of the present invention relates to providing a score for rating a haptic device.

BACKGROUND

Commercial applications of haptic sensation or tactile feedback in modern electronic devices have become more prevalent in recent years. Although various mechanical and/or electrical components for generating haptic sensation have predefined specifications as well as test results, the information relating to specifications and test results is typically useful to experts, engineers, or professionals. The range of mechanical resonance or optimal frequency range, however, typically means little, if any, to end users or consumers.

To generate a haptic feedback, a vibration device such as an actuator can be used. Scoring and/or rating the capabilities of actuator, for example, can be important to evaluate haptic response. Conventional existing vibration hardware, for instance, consists of a set of objective test scenarios that measure various performance aspects of individual actuators. The results of such objective tests are often used by field or application engineers to characterize haptic force feedback relating to haptic devices such as handsets.

A problem associated with the current approach is that although the specifications and test results may provide guidance to licensees or professionals, they provide indiscernible information to general public or end users.

SUMMARY

A method for scoring a haptic device using subjective and objective measurements is disclosed. A method of process, in one embodiment, is configured to obtain multiple objective measurements and the subjective measurements, wherein the objective measurements describe the performance of the haptic device. The subjective measurements indicate users' feedback and/or experience in connection with the haptic device. The process is capable of generating a score in response to the objective measurements and the subjective measurements. The score, for example, can be used to rate and/or evaluate the performance of the haptic device. In an alternative embodiment, the process also obtains feature measurements, which indicate user features relating to the haptic device. The score may be updated in response to the feature measurements.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiments of the present invention are described herein in the context of a method, system and apparatus for providing a process of scoring a haptic device using objective measurements and subjective measurements.

Those ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions be made in order to achieve the developer's specific goals, such as compliance with application- and business-related constraints, and that these specific goals vary from one implementation to another and from one developer to another. Moreover, it will be appreciated that such a development effort might be complex and time-consuming, but would nevertheless be a routine undertaking of engineering for those of ordinary skills in the art having the benefit of this disclosure.

A scoring process using subjective and objective measurements to score a haptic device is disclosed. The process, in one embodiment, is configured to obtain multiple objective measurements and the subjective measurements, wherein the objective measurements describe the performance of the haptic device. The subjective measurements indicate users' feedback and/or experience in connection with the haptic device. The process is capable of generating a score in response to the objective measurements and the subjective measurements. The score, for example, can be used to rate and/or evaluate the performance of the haptic device. In an alternative embodiment, the process also obtains feature measurements, which indicates user features relating to the haptic device. The score may be updated in response to the feature measurements.

Figure 1:
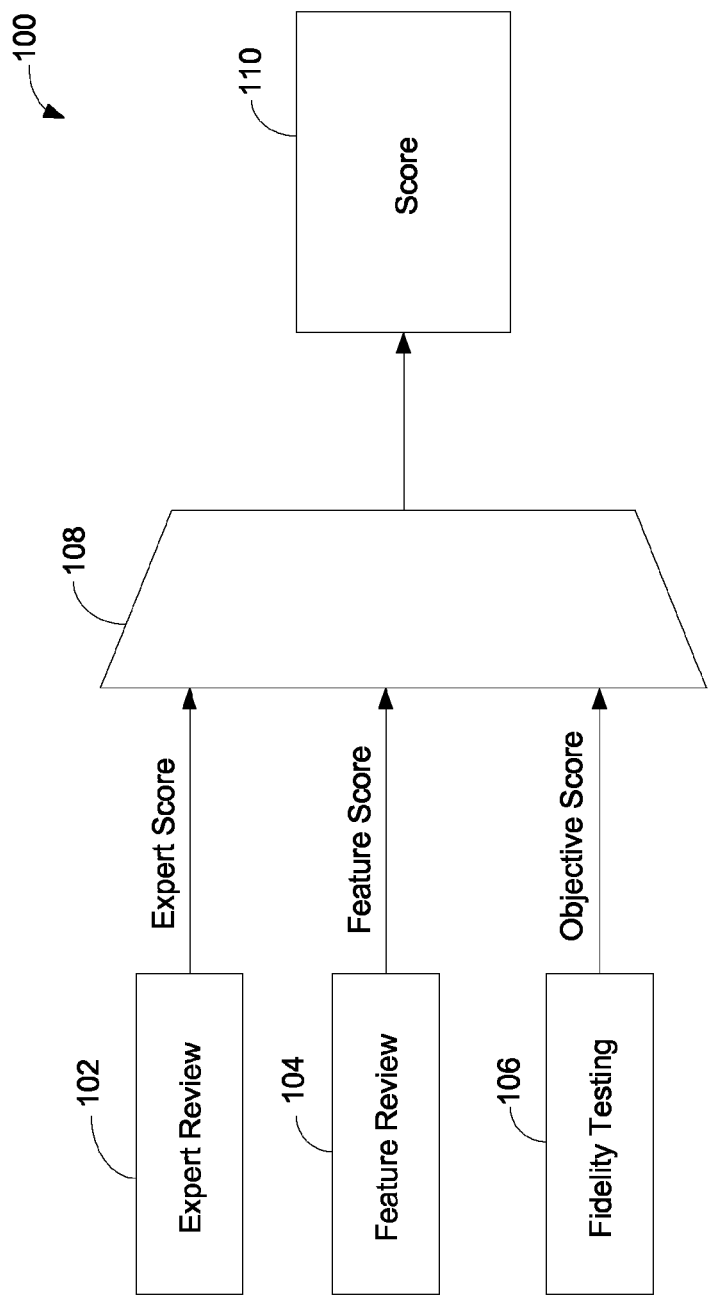
FIG. 1 is a block diagram illustrating a scoring process using objective and subjective measurements in accordance with one embodiment of the present invention.

FIG. 1 is a block diagram 100 illustrating a scoring process using objective and subjective measurements in accordance with one embodiment of the present invention. Diagram 100 includes an expert review component 102, a feature review component 104, a fidelity testing component 106, and a scoring component 110. Diagram 100 further includes a summation component 108, which summarizes a set of results in response to the outputs from components 102-106. It should be noted that the underlying concept of the exemplary embodiment of the present invention would not change if one or more blocks were added to or removed from diagram 100.

Summation component 108, in one embodiment, is configured to receive an expert score, a feature score, and an objective score. The expert score is generated by expert review component 102 and the feature score is generated by feature review component 104. Similarly, the objective score is generated and provided by fidelity testing component 106. It should be noted that the expert score, feature score, and/or objective score can be a single score or a set of scores. Summation component 108 is capable of generating and providing an output to score component 110 in response to the expert score, feature score, and objective score. It should be noted that additional data or scores or weights may be also fed to summation component 108, which subsequently summarizes an output in accordance with the inputs. For instance, a set of weights may be sent to summation component 108, wherein the weights may be used to indicate the importance of the scores and/or inputs.

An advantage of using a scoring process is to provide a single objective oriented summary metric or score to rate or evaluate a haptic device such as a handset. The process, for example, incorporates various objective and psychophysical measures into a single tactile value or score, which is subsequently used to rate or judge a haptic device as a whole. The haptic feedback may also be referred to as tactile effect, tactile feedback, haptic effect, force feedback, or vibrotactile feedback. The summary metric is generated in accordance with a set of objective measurements, which may include fidelity elements and/or feature elements. The fidelity element, for instance, characterizes the mechanical performance of the haptic handset while the feature element delineates haptic features of the handset. The summary metric essentially provides an objective rating for a haptic device, such as a cellular phone, a PDA (personal digital assistant), smart phone, a handset, a game controller, and the like.

Expert review component 102, in one embodiment, provides subjective ratings or opinions from various sectors of demographic population. For example, opinions, ratings, feedbacks, surveys and/or comments, hereinafter referred to as opinions, may be collected from experts, engineers, designers, users, consumers, sellers, young adults, and the like. The opinions or data can be gathered through various methods, such as interviews, surveys, ratings, et cetera. Depending on the applications, various data sets collected from different sources may be weighted in accordance with a set of predefined weight vectors. It should be noted that the subjective rating, also known as subjective element or feel element, can be used together with the fidelity and feature elements to provide a more comprehensive rating for a specific haptic product, such as a handset or PDA.

Feature review component 104, for instance, is configured to provide a feature score or scores to summation component 108. Feature review component 104 identifies features or distinctive characteristics, product qualities, aesthetic appearance, and/or haptic features of a haptic device. For example, a haptic feature can be determined by exhaustively enumerating haptic enabled features on the device. During an operation, a list of haptic features is used to determine what haptic features are present. Upon determination of the features, vectors 1's and/or 0's are entered in accordance with the list, wherein a vector 1 indicates that the feature is found while a vector 0 indicates that the feature is absent. After establishing the vector values, a dot product of vectors with preexisting weights is implemented to provide a feature score for the haptic handset. It should be noted that each preexisting weight vector may contain information collected from market feedback as well as engineering testing. It should be noted that the vectors identify relative importance of a feature to a particular handset. For example, different vectors with different weights can be employed for different types of haptic handsets (i.e., touchscreen vs. non-touchscreen).

Fidelity testing component 106 provides an objective score in connection with a target haptic device. A handset, which could include haptic features, can be any types of handheld devices such as a cellular phone, a PDA, video games, and the like. Under fidelity testing component 106, each haptic device is subjected to a number of pre-defined tests to obtain mechanical properties. Mechanical properties include acceleration time, rise time, active brake time, volume, weight, size, et cetera. Each haptic device or handset has a specific set of physical specifications, and dynamic ranges, which can be determined through tests.

During operation, a set of physical specifications or properties is identified. Upon formation of a vector, a fidelity score is calculated via a dot product of the specification vector with a predetermined psychophysical weight vector. It should be noted that the psychophysical weight vector is determined in advance through comparative testing of users. The physical parameters relating to haptic handsets can systematically vary. As such, users are surveyed or interviewed to provide evaluation of resulting tactile sensation. Statistical analysis of test results yields the psychophysical importance of each physical parameter, which is also known as a weight vector(s).

Scoring component 110, in one embodiment, is configured to provide a score or a summary score indicating an overall score for a haptic handset. Scoring component 110 is capable of receiving input(s) from summation component 108, which provides a set of data to component 110. It should be noted that component 110 provides a score in response to the subjective as well as objective weighted vectors to generate an overall score for a haptic product. The scoring process, in one embodiment, uses a touchmeter subjective scoring method, which rates or evaluates a particular haptic handset. Touchmeter, for example, incorporates both objective and subjective measures related to the handset. To implement the touchmeter subjective scoring method, it reviews and enumerates vibe enabled features and applies psychophysical weights in connection to tested physical data.

To generate a final score or scores indicating a rating of a haptic device, subjective measurements from expert review 102 and objective measurements from feature review 104 and fidelity testing 106 need to be summarized. For example, when an expert provides one or more scores for a set of haptic features, the expert score should be incorporated into a final summary score. In addition, the weights attached to the expert scores, feature scores, or objective scores may also be used to calculate a final score. It should be noted that the weights may be determined initially by persons, such as project staff, users, experts, and the like, and they can be refined by field (or real) data over time. It should be noted that the weights associated to various scores or data should be reevaluated on a regular basis.

Figure 2:
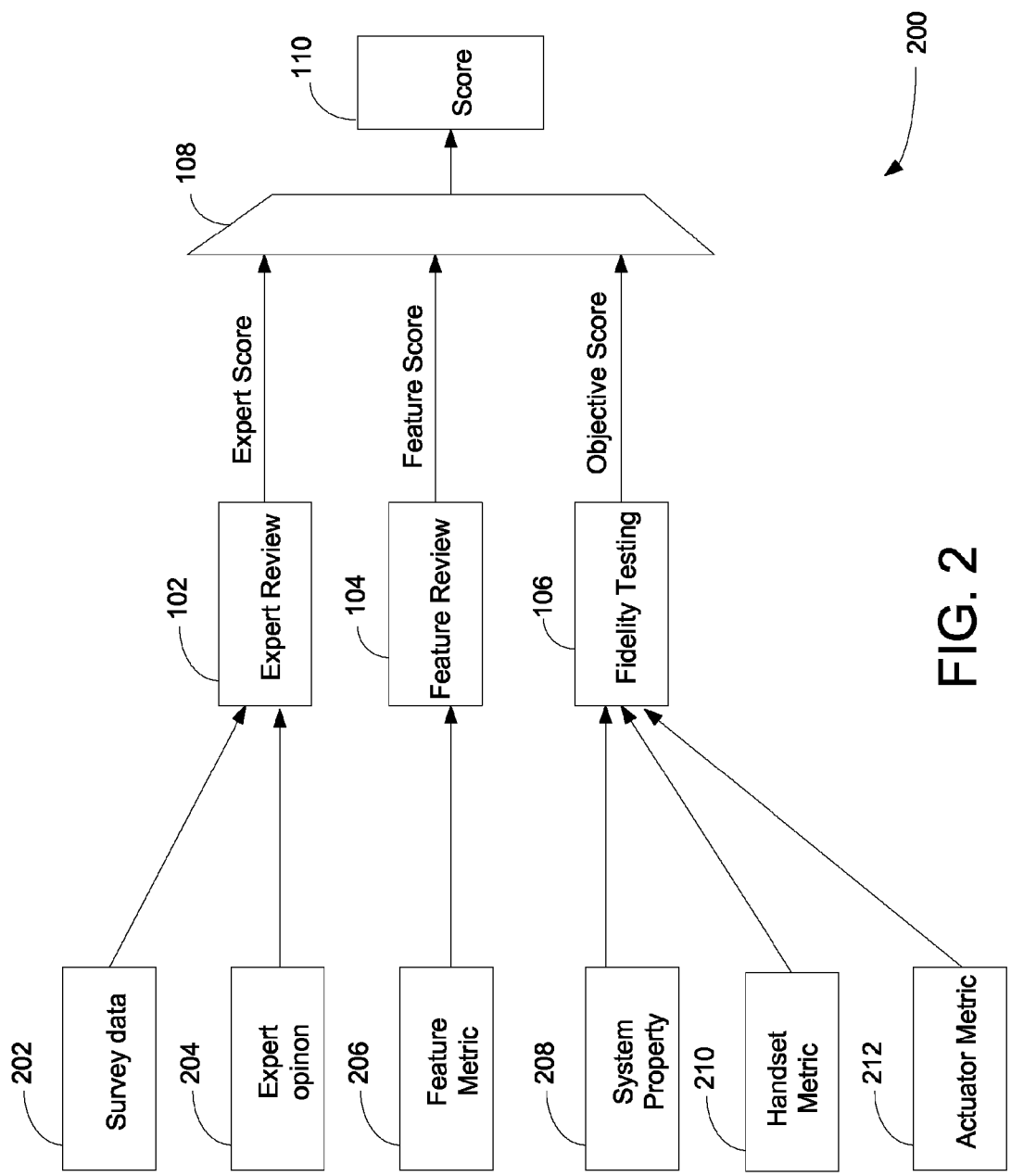
FIG. 2 is a block diagram illustrating a scoring process having additional steps in accordance with one embodiment of the present invention.

FIG. 2 is a block diagram 200 illustrating a scoring process method having additional steps in accordance with one embodiment of the present invention. Diagram 200 includes an expert review component 102, a feature review component 104, a fidelity testing component 106, a summation component 108, and a scoring component 110. Diagram 200 further includes a survey data block 202, an expert opinion block 204, a feature metric block 206, a system property block 208, a handset metric block 210, and an actuator metric block 212. It should be noted that the underlying concept of the exemplary embodiment of the present invention would not change if one or more blocks were added to or removed from diagram 200.

Expert Review component 102 is configured to receive inputs from survey data block 202 and expert opinion block 204. Survey data block 202, in one embodiment, is configured to provide information collected through surveys. A survey process, for example, may involve mailing surveys, telephonic calls, face-to-face surveys, and the like. Survey data block 202 collects and/or stores the data in a storage location, and the data is, in one example, updated periodically. Alternatively, survey data block 202 receives and updates the surveyed data in real-time via a communications network.

Expert opinion block 204 includes a survey mechanism that collects various subjective ratings and/or preferences from expert groups, such as professional handset evaluators, testing engineers, designers, field engineers, handset marketers, sales personnel, and the like. Block 204 obtains opinions through various approaches, such as testing, surveys, interviews, et cetera. Depending on the application, aesthetic appearance of a haptic handset can be more important than the functionality of the device. For instance, a futuristic appearance of a cell phone such as iPhone® is more important than the functionalities of the phone.

It should be noted that expert review component 102 is capable of receiving other blocks such as demographic block and environmental block. For instance, demographic block is responsible to collect preferences or subjective ratings from different age groups. The demographic block may also include data from different household income groups. The environmental block, on the other hand, can be configured to gather preferential data from groups of users operating handsets under unique environments, such as desert, aquatic, space, underwater, and/or normal conditions. The environmental block may also gather preferences in ergonomic and/or environmental friendly devices.

Fidelity testing component 106 is configured to receive inputs from system property block 208, handset metric block 210, and actuator metric block 212. Actuator metric block 212 is configured to provide physical performance related to motors and/or actuators. The actuator is used to generate haptic sensation. The metric of the actuator specification, in one embodiment, is obtained through a test or multiple tests. The following entries listed in Table 1 illustrate exemplary performance specifications relating to an actuator.

TABLE 1

Actuator Performance Test Results

| # | Performance Element | Units of measure | Acceptable Range | Measure Value | Test Result |
|---|---|---|---|---|---|
| 1 | Target acceleration | Gravities (g) Frequency (Hz) | $A_{peak-to-peak} > 1.20$ g $100.00$ Hz $<= F_{target} <= 220.00$ Hz | 2.30 g | Pass |
| 2 | Rise time | Milliseconds (ms) | Rise time < 75.00 ms | 96.90 ms | Fail |
| 3 | Stop time | Milliseconds (ms) | Stop time < 200.00 ms | 209.60 ms | Fail |
| 4 | Active Brake time | Milliseconds (ms) | Active brake time < 50.00 ms | 47.20 ms | Pass |
| 5 | Acceleration efficiency | Gravities/ Watt (g/W) | $A_{\mathit{eff}} > 2.00$ g/W | 6.02 g/W | Pass |

Table 1 illustrates a set of fidelity test results in connection with a particular actuator, wherein five performance elements are tested. For example, the test results illustrate that the performance elements of "Target acceleration", "Active brake time" and "Acceleration efficiency" have passed the test. The test results also show that performance elements of "rising time" and "stop time" have failed the test in accordance with the predefined acceptable range. It should be noted that actuator metric 212 is capable of storing and forwarding such fidelity test results to fidelity testing component 106.

In an alternative embodiment, an actuator scoring system, which integrates actuator's life-time testing data, is used to generate an actuator score. After capturing actuator's peak to peak acceleration, rise time and active braking time, the actuator scoring system characterizes and converts the fidelity score measurements into scores from 0 to 10, as illustrated in the following table:

TABLE 2

Actuator Score Table

| Acceleration (g) | Rise Time (ms) | Active Brake Time (ms) | Score |
|---|---|---|---|
| 0 | 95 | 62 | 0 |
| 0.9 | 90 | 60 | 1 |
| 1 | 85 | 57 | 2 |
| 1.1 | 80 | 54 | 3 |
| 1.2 | 75 | 50 | 4 |
| 1.3 | 65 | 46 | 5 |
| 1.4 | 60 | 42 | 6 |
| 1.5 | 55 | 38 | 7 |
| 1.6 | 50 | 33 | 8 |
| 1.7 | 40 | 28 | 9 |
| 1.8 | 0 | 0 | 10 |

Note that bold and underlined values correspond to the minimum acceptable actuator and the passing score is 4 out of 10 in each category. The testing results of acceleration, rise time, and brake time are subsequently combined with, for instance, equal weight (i.e. multiply their sum by 3.33) to generate a 0-100 score for a particular actuator.

Alternatively, upon passing a life-time test, a second ($2^{nd}$) summary score is generated for the actuators. The first and second scores for an actuator are thereafter combined. A score of 40 or less, for example, indicates that the actuator is not capable of supporting a particular haptic application. On the other hand, a combined score of 100 indicates that the actuator is ideal for a particular haptic application.

Handset metric block 210, in one embodiment, is configured to provide mechanical properties other than actuators as described previously. Beyond individual actuators, various other types of mechanical, electrical, and software components can affect the performance of the haptic device. For example, the location of actuator placed in the haptic device can be an important factor. It should be noted that the mechanical properties for each handset have significant effect on the perceived quality of users' haptic or tactile or vibration experience. The following entries listed in Table 3 illustrate mechanical properties and objective measures relating to the properties.

TABLE 3

Objective measurements regarding mechanical property

| Mechanical Property | Possible Objective Measure |
|---|---|
| Location with respect to Center Of Gravity ("COG") | Measure distance actuator is placed from the COG of the device. |
| Location with respect to grasp intended use | Measure distance actuator is placed relative to intended grasp |
| Actuator Coupling | Assess actuator coupling to casing or input element |

TABLE 3-continued

Objective measurements regarding mechanical property

| Mechanical Property | Possible Objective Measure |
|---|---|
| Actuator orientation | Angle with respect to principle moment of inertia |
| Presence of additional Harmonics | There should be minimum or no harmonics above 225 Hz |
| Acoustic Noise | The device should make < some threshold of noise throughout operation. Mechanical resonances should not unduly interfere with haptic sensation. |
| Handset Mass | The peak acceleration needs to be adjusted according to the hand set mass. For example if the mass is low the peak acceleration needs to be higher. |
| Ergonomics of Grasp | The handset should be comfortable to grasp |
| Quality of casing | The casing should not have any creaks and have a quality feeling to the sense of touch. |
| Belt/Pocket Response | The device should provide sufficient acceleration for pocket/belt notification. |

Table 3 illustrates a list of exemplary mechanical properties, which can be measured in accordance with other properties such as ergonomic data. For example, the location with respect to the center of gravity ("COG") of a haptic device can be determined via measuring the distance between the actuator(s) and the COG. Also, actuator's orientation may determine the angle of principle of moment of inertia. To obtain objective measurements of mechanical properties, the ratio between device body mass and actuator mass can also be an important factor, especially relative to peak acceleration of the actuator. It should be noted that objective measurements from mechanical properties can be measured via tests and/or field verifications. User testing data or feedback can also be used to validate testing data.

System property block 208, also known as controller property block, is used to provide handset information relating to overall system quality, capabilities, haptic feedback, and limitations in connection with software, firmware, and hardware. For example, block 208 provides system properties concerning dynamic ranges and performances enabled by control firmware. System properties also include, for example, the reliability of Operating System ("OS") and the linearity of output amplifier. The following entries listed in Table 4 illustrate exemplary controller/system properties and objective measures.

TABLE 4

Controller/system properties

| Property | Units | Test | Note |
|---|---|---|---|
| Variable Magnitude: Output resolution | Levels | L > 32 | For the whole input range measured in distinct acceleration values |
| Variable Magnitude: Sample Rate | Rate | 200 Hz | Rate that the magnitude can be set |
| Output linearity | % | +−10% | A line fitted to the data. |
| Envelope Bandwidth | Hz | | Achievable envelope bandwidth for a fixed acceleration say 1.2 g's |
| Timing against Reference file | % time | +−10% | Duration and timing for 2 pulses: 0.5 On, 0.5 off 0.25 On; 5Hz signal 2sec. Others can be added. |
| Latency | Time | <30 ms | Time between user initiating an action and actuator response |

It should be further noted that system properties may include other properties that are not listed in Table 4.

Feature review component 104 accepts inputs from feature metric block 206, which provides objective measurements of features for a haptic handset. Feature metric block 206, for example, is capable of providing a set of objective properties describing or characterizing a handset. The objective properties also include various user and/or developer interfaces, such as, haptic feedback, vibration control, drop notifications, menu feedback, gaming application program interface ("API"), and the like to facilitate haptic implementation. For example, features relating to user interface may include touchscreen feedback, touchscreen size, key press haptic feedback, scrolling support, variant effects for different actions, and the like.

The feature properties, in one embodiment, can be measured on a small scale (i.e., 1-3 or 1-5) via expert reviewers. For instance, relative weights for different features suggested by an expert may be added. After the handsets are commercialized, market survey may be used to capture the real market data regarding the haptic device. The following entries listed in Table 5 illustrate exemplary feature metrics.

TABLE 5

Exemplary feature metrics

| Feature | Metric |
|---|---|
| Gaming support | On/Off |
| | VibeTonz |
| User Interface | Touchscreen feedback |
| | Touchscreen size |
| | Key press haptic feedback |
| | Scrolling support |
| | Variant effects for different actions/buttons |
| Ringtone Support | None |
| | On/Off (SP-MIDI, SMAF, etc.) |
| | VibeTonz |
| Silent Mode | Basic vibration |
| | On/Off (SP-MIDI, SMAF, etc.) |
| | VibeTonz |
| Service Alerts | Call drop |
| | Minute reminder |
| | SMS/MMS delivery |
| | Hour reminder |
| | Appointment reminder |
| | Alarm/wake-up |
| | Call waiting |
| | Call answer |
| Location Based Services | Target proximity alert |

It should be noted that a summary of feature measurements can be generated by assigning points or weights to each feature. For example, an ideal handset may add up a score to a hundred (100). It should be further noted that the relative importance of each feature may be decided by a user or a panel of handset experts or a group of business and/or engineering staffs.

Figure 3:
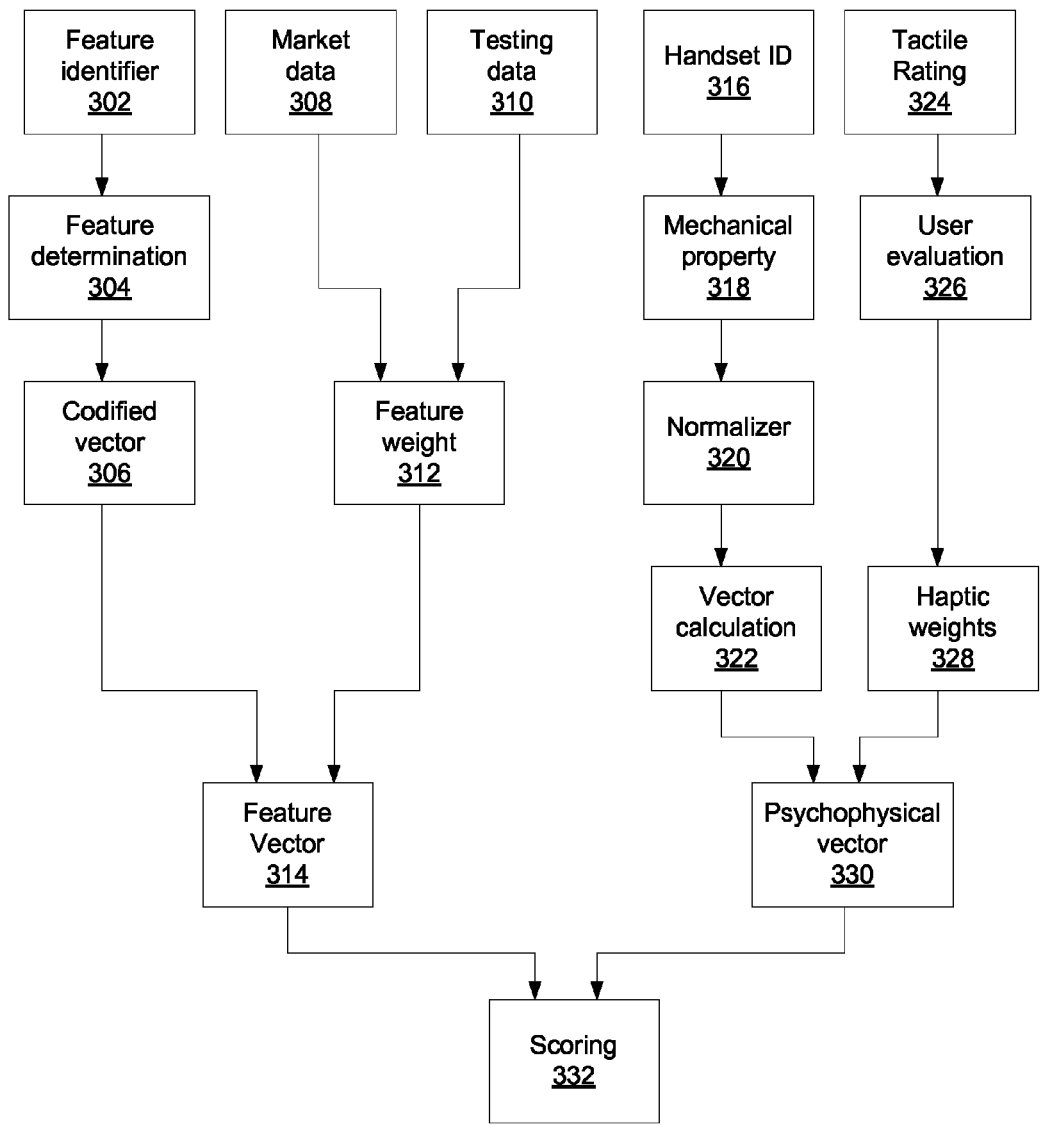
FIG. 3 is a logic block diagram illustrating a data flow of a scoring process in accordance with one embodiment of the present invention.

FIG. 3 is a logic block diagram 300 illustrating a data flow of a scoring process in accordance with one embodiment of the present invention. A scoring block 332 is capable of scoring or rating a haptic handset in accordance with inputs from a feature vector 314 and a psychophysical vector 330. In one embodiment, the information generated by feature vector 314 and psychophysical vector 330 are weighted in accordance with the haptic applications. It should be noted that the underlying concept of the exemplary embodiment of the present invention would not change if one or more blocks were added to or removed from diagram 300.

Feature vector 314, in one embodiment, is configured to receive inputs from codified vector 306 and feature weight 312, wherein feature weight 312 is further configured to accept input from market data 308 and testing data 310. In this embodiment, market data 308 collects commercial data from the market or markets while testing data 310 gathers data from user or users from various sectors of demographical social groups. Codified vector 306 is used to codify a feature score with a one (1) vector or a zero (0) vector in response to feature determination 304 and feature identifier 302.

During an operation, the feature score is determined by enumerating haptic enabled features. After determining features in accordance with a list, the items on the list are codified as vectors of 1's and 0's, wherein vector 1 indicates that the feature is found while vector 0 indicates that the feature is missing. The dot product of the vector with a preexisting weight vector provides a feature score of a handset. It should be noted that a preexisting weight vector contains information about the market research and testing results. Different weight vectors may be used for different types of handsets depending on the haptic applications.

Psychophysical vector 330, in one embodiment, is configured to combine a set of objective measurements with a set of subjective preferences. For example, psychophysical vector 330 is capable of generating a fidelity score in response to the inputs from vector calculation 322 and haptic weights 328. While haptic weights 328 generates output in accordance with a user evaluation 326 and tactile rating 324, vector calculation 322 calculates an output value in response to input from a normalizer 320, a mechanical property block 318, and a handset identifier 316.

Each handset is evaluated according to pre-defined tests, and a specific handset may be rated according to a specific set of physical specifications. After normalizing the specifications, a fidelity score is calculated using the function of dot product in response to the specification vectors and predetermined psychophysical weight vectors. In one example, the psychophysical weight vector is determined through comparative tests. Psychophysical vector 330 provides statistical analysis for test results, wherein the statistical analysis yields a psychophysical importance for each weighted physical parameter.

The exemplary embodiment(s) of the present invention includes various processing steps which will be described below. The steps of the embodiments may be embodied in machine or computer executable instructions. The instructions can be used to cause a general purpose or special purpose system, which is programmed with the instructions, to perform the steps of the present invention. Alternatively, the steps of the present invention may be performed by specific hardware components that contain hard-wired logic for performing the steps, or by any combination of programmed computer components and custom hardware components.

Figure 4:
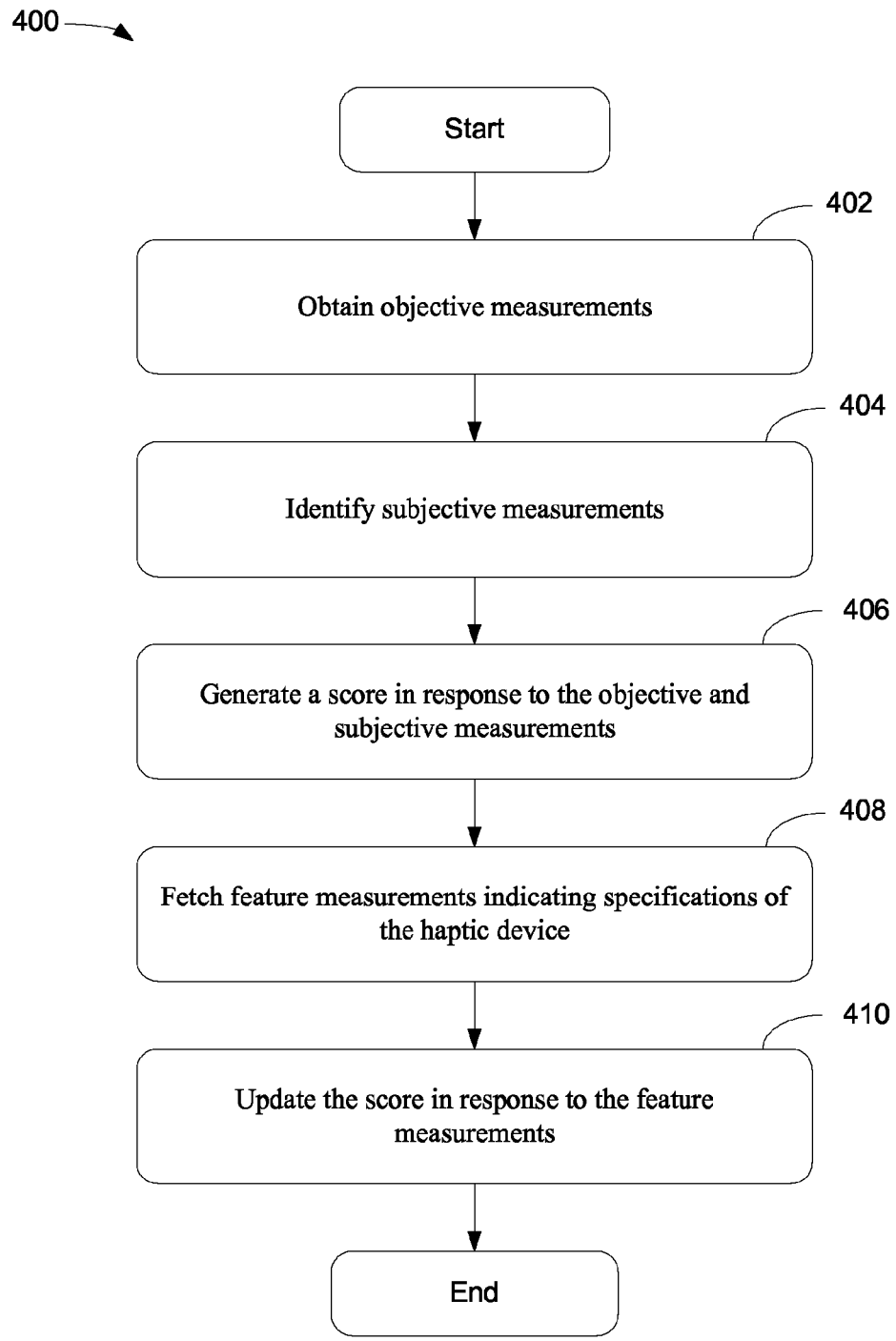
FIG. 4 is a flowchart illustrating a scoring process for a haptic device in accordance with one embodiment of the present invention.

FIG. 4 is a flowchart 400 illustrating a scoring process for a haptic device in accordance with one embodiment of the present invention. At block 402, a process obtains a set of objective measurements describing performance of a haptic device. In one embodiment, the process further obtains actuator metrics, device metrics, and controller properties. For example, actuator acceleration, rise time, stop time, brake time, and acceleration efficiency may be obtained via a method of collecting actuator data. Alternatively, the process can also collect device data relating to actuator coupling, actuator orientation, acoustic noise, handset mass, and ergonomics. Similarly, the process can also collect properties relating to display resolution, sample rate, output linearity, bandwidth, and latencies. After block 402, the process proceeds to the next block.

At block 404, the process identifies subjective measurements indicating users' feedback regarding the haptic device. For example, the process can be configured to collect experts' opinions, consumers' preferences, and survey results. After block 404, the process moves to the next block.

At block 406, the process generates a score in response to the objective measurements and the subjective measurements for providing a performance rating of a haptic device. In one embodiment, the process calculates a number in accordance with predefined weights in connection with the objective measurements and the subjective measurements. After block 406, the process proceeds to the next block.

At block 408, the process fetches feature measurements indicating specifications of the haptic device. In one embodiment, the process measures a gaming support feature, user interface feature, ringtone feature, silent mode feature, and service alerts feature. Alternatively, the process is further capable of recording measurements in connection with the gaming support feature, user interface feature, ringtone feature, silent mode feature, and service alerts feature. After block 408, the process moves to the next block.

At block 410, the process is capable of updating the score in response to the plurality of feature measurements. It should be noted that the score, which includes both objective measurements and subjective measurements, provides a rating for the haptic handset. After block 410, the process ends.

Figure 5:
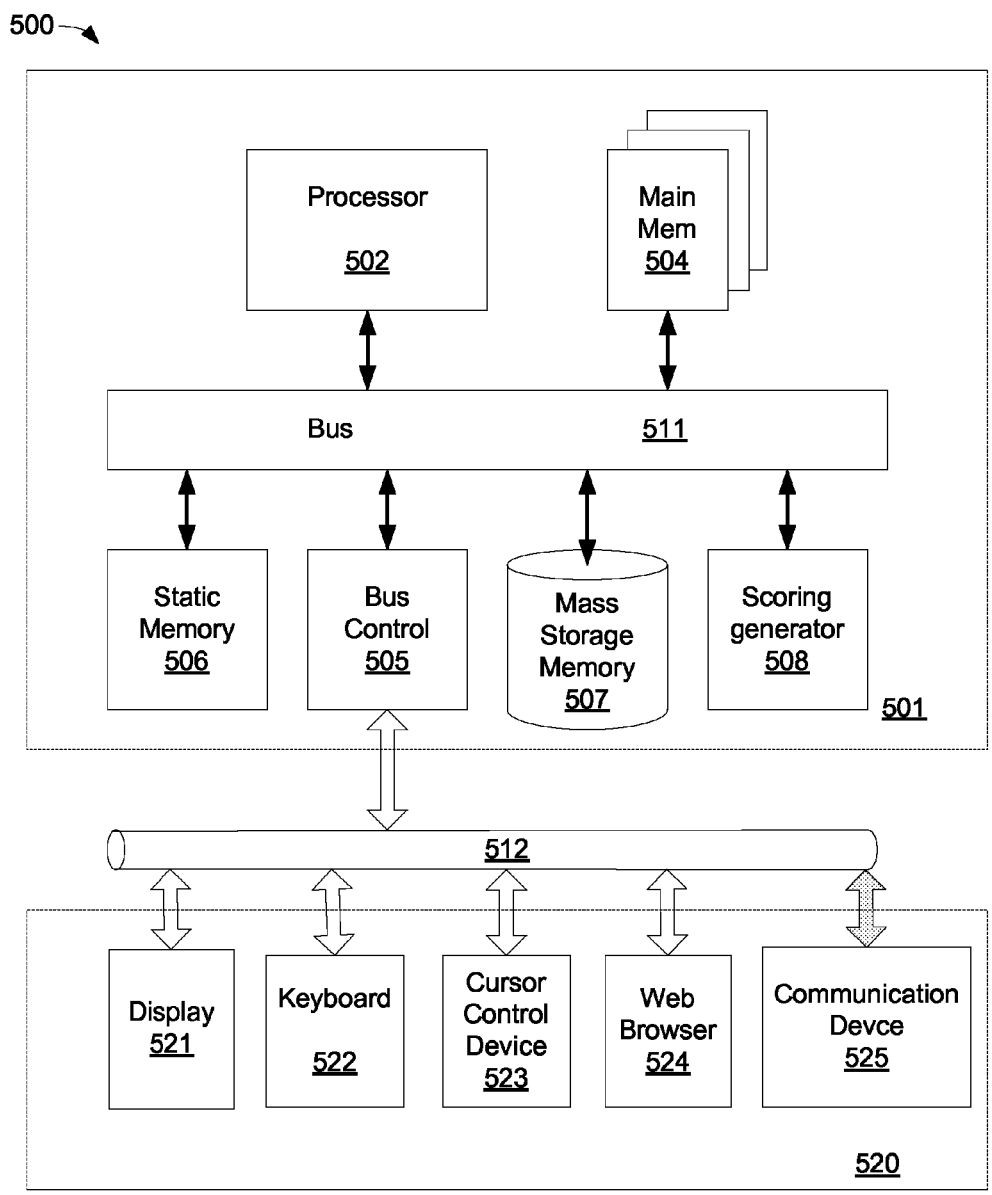
FIG. 5 is a system block diagram illustrating a system capable of implementing a scoring process for a haptic device in accordance with one embodiment of the present invention.

Having briefly described one embodiment of a process of scoring a haptic handset using objective and subjective measurements in which the exemplary embodiment of present invention operates, FIG. 5 illustrates an exemplary computer system capable of scoring a haptic handset in which the features of the present embodiment may be implemented. It will be apparent to those of ordinary skills in the art that other alternative computer system architectures may also be employed.

Computer system 500 includes a processing unit 501, an interface bus 512, and an input/output ("IO") unit 520. Processing unit 501 includes a processor 502, a main memory 504, a system bus 511, a static memory device 506, a bus control unit 505, and a mass storage memory 507. Bus 511 is used to transmit information between various components and processor 502 for data processing. Processor 502 may be any of a wide variety of general-purpose processors, embedded processors, or microprocessors such as ARM® embedded processors, Intel® Core™2 Duo, Core™2 Quad, Xeon®, Pentium™ microprocessor, Motorola™ 68040, AMD® family processors, or Power PC™ microprocessor.

Main memory 504, which may include multiple levels of cache memories, stores frequently used data and instructions. Main memory 504 may be RAM (random access memory), MRAM (magnetic RAM), or flash memory. Static memory 506 may be a ROM (read-only memory), which is coupled to bus 511, for storing static information and/or instructions. Bus control unit 505 is coupled to buses 511-512 and controls various components, such as main memory 504 or processor 502. Mass storage memory 507 may be a magnetic disk, an optical disk, hard disk drive, floppy disk, CD-ROM, and/or flash memories for storing large amounts of data.

I/O unit 520, in one embodiment, includes a display 521, keyboard 522, cursor control device 523, web browser 524, and communication device 525. Display device 521 may be a liquid crystal device, cathode ray tube ("CRT"), touch-screen display, or other suitable display device. Display 521 projects or displays graphical images or windows. Keyboard 522 can be a conventional alphanumeric input device for communicating information between computer system 500 and computer operator(s). Another type of user input device is cursor control device 523, such as a mouse, touch mouse, trackball, or other type of cursor for communicating information between system 500 and user(s).

Communication device 525 is coupled to bus 512 for accessing information from remote computers or servers through wide-area network. Communication device 525 may include a modem, a router, or a network interface device, or other similar devices that facilitate communication between computer 500 and the network.

Processing unit 501 further includes a scoring generator 508, which is capable of scoring a haptic feature concerning a haptic device. Generator 508 facilitates and calculates a score, which rates the haptic feedback in connection with the handset, in response to a set of objective as well as a set of subjective measurements.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A method for scoring a haptic device, comprising:
   obtaining a plurality of objective measurements describing performance of the haptic device, wherein obtaining the plurality of objective measurements include obtaining measurements regarding actuator metrics, device metrics, or controller properties associated with the haptic device;
   identifying a plurality of subjective measurements indicating users' feedback regarding the users' opinion of the haptic device; and
   generating a score in response to the plurality of objective measurements and the plurality of subjective measurements, wherein the score provides a performance rating for the haptic device based on the plurality of objective measurements and the plurality of subjective measurements.

2. The method of claim 1, further comprising:
   determining a plurality of feature measurements indicating specifications of the haptic device; and
   updating the score to generate an updated score in response to the plurality of feature measurements.

3. The method of claim 2, wherein determining a plurality of feature measurements further includes measuring a gaming support feature, a user interface feature, a ringtone feature, a silent mode feature, or a service alerts feature.

4. The method of claim 3, wherein measuring a gaming support feature, a user interface feature, a ringtone feature, a silent mode feature, or a service alerts feature includes recording measurements in connection with the gaming support feature, the user interface feature, the ringtone feature, the silent mode feature, or the service alerts feature.

5. The method of claim 1, wherein obtaining measurements regarding actuator metrics further includes collecting actuator data relating to actuator acceleration, rise time, stop time, brake time, or acceleration efficiency.

6. The method of claim 1, wherein obtaining measurements regarding device metrics includes collecting device data relating to actuator coupling, actuator orientation, acoustic noise, handset mass, or ergonomics.

7. The method of claim 1, wherein obtaining measurements regarding controller properties includes collecting properties relating to display resolution, sample rate, output linearity, bandwidth, or latencies.

8. The method of claim 1, wherein identifying a plurality of subjective measurements indicating users' feedback regarding the users' opinion of the haptic device further includes collecting experts' opinions, consumers' preferences, or survey results.

9. The method of claim 1, wherein generating a score further includes calculating a number in accordance with predefined weights in connection with the plurality of objective measurements and the plurality of subjective measurements.

10. A method for rating a haptic device, comprising:
    generating an expert score to indicate a subjective measurement regarding experts' opinion of the haptic device;
    calculating a feature score to indicate a feature measurement regarding one or more features associated with the haptic device;
    computing an objective score to indicate an objective measurement regarding a plurality of actuator parameters associated with at least one actuator of the haptic device; and
    providing a device summary score in accordance with the export score, the feature score, and the objective score, wherein the device summary score provides a performance rating for the haptic device.

11. The method of claim 10, wherein generating an expert score further includes collecting data relating to subjective rating of the haptic device across multiple demographic populations.

12. The method of claim 10, wherein calculating a feature score further includes calculating fidelity score in response to a predetermined psychophysical weight vector.

13. The method of claim 10, wherein computing an objective score includes identifying actuator characteristics, specifications, and performance.

14. The method of claim 10, wherein providing a device summary score further includes generating a score in accordance with predefined weighted values of the export score, the feature score, and the objective score.

15. The method of claim 10, wherein the objective score indicates whether the at least one actuator supports a particular haptic application based on the objective measurement regarding the plurality of actuator parameters.

16. The method of claim 10, wherein the one or more features include one or more haptic enabled features associated with the haptic device, and wherein calculating a feature score comprises:
    determining whether the one or more haptic enabled features are present in the haptic device;
    generating at least one vector based on the determination; and
    generating the feature score based on the generated at least one vector and a predefined weight vector.

17. An apparatus for scoring a haptic device, comprising:
    means for obtaining a plurality of objective measurements describing performance of the haptic device, wherein means for obtaining the plurality of objective measurements include means for obtaining measurements regarding actuator metrics, device metrics, or controller properties associated with the haptic device;
    means for identifying a plurality of subjective measurements indicating users' feedback regarding the users' opinion of the haptic device; and
    means for generating a score in response to the plurality of objective measurements and the plurality of subjective measurements, wherein the score provides a performance rating for the haptic device based on the plurality of objective measurements and the plurality of subjective measurements.

18. The apparatus of claim 17, further comprising:
means for determining a plurality of feature measurements indicating specifications of the haptic device; and
means for updating the score to generate an updated score in response to the plurality of feature measurements.

19. The apparatus of claim 18, wherein means for determining a plurality of feature measurements further includes means for measuring a gaming support feature, a user interface feature, a ringtone feature, a silent mode feature, or a service alerts feature.

20. The apparatus of claim 19, wherein means for measuring a gaming support feature, a user interface feature, a ringtone feature, a silent mode feature, or a service alerts feature includes means for recording measurements in connection with the gaming support feature, the user interface feature, the ringtone feature, the silent mode feature, or the service alerts feature.

21. The apparatus of claim 17, wherein means for obtaining measurements regarding actuator metrics further includes means for collecting actuator data relating to actuator acceleration, rise time, stop time, brake time, or acceleration efficiency.

22. The apparatus of claim 17, wherein means for obtaining measurements regarding device metrics includes means for collecting device data relating to actuator coupling, actuator orientation, acoustic noise, handset mass, or ergonomics.

* * * * *

UNITED STATES PATENT AND TRADEMARK OFFICE
CERTIFICATE OF CORRECTION

| | | |
|---|---|---|
| PATENT NO. | : 8,380,561 B1 | Page 1 of 1 |
| APPLICATION NO. | : 12/182507 | |
| DATED | : February 19, 2013 | |
| INVENTOR(S) | : Victor Viegas et al. | |

It is certified that error appears in the above-identified patent and that said Letters Patent is hereby corrected as shown below:

On title page, item (75)
replace "Erin Ramasy"
with --Erin Ramsay--.

Signed and Sealed this
Fourteenth Day of May, 2013

Teresa Stanek Rea
*Acting Director of the United States Patent and Trademark Office*